United States Patent
Nikrin et al.

(10) Patent No.: US 10,101,201 B2
(45) Date of Patent: Oct. 16, 2018

(54) SYSTEM FOR CONTINUOUS LASER BEAM MONITORING AND ANALYSIS

(71) Applicant: MEDTRONIC, INC., Minneapolis, MN (US)

(72) Inventors: Peter M. Nikrin, Ramsey, MN (US); David J. Buendorf, Maple Grove, MN (US); Dennis L. Howard, Forest Lake, MN (US); Paul C. Ray, Maple Grove, MN (US); Matthew J. Sanders, Wayzata, MN (US)

(73) Assignee: Medtronic, Inc., Minneapolis, MN (US)

( * ) Notice: Subject to any disclaimer, the term of this patent is extended or adjusted under 35 U.S.C. 154(b) by 180 days.

(21) Appl. No.: 14/078,886

(22) Filed: Nov. 13, 2013

(65) Prior Publication Data
US 2015/0129750 A1  May 14, 2015

(51) Int. Cl.
*G01J 1/42* (2006.01)
*B23K 26/03* (2006.01)
*B23K 31/12* (2006.01)
*B23K 26/70* (2014.01)
*B23K 26/0622* (2014.01)
*H01S 3/00* (2006.01)

(52) U.S. Cl.
CPC .......... *G01J 1/4257* (2013.01); *B23K 26/03* (2013.01); *B23K 26/0622* (2015.10); *B23K 26/705* (2015.10); *B23K 31/125* (2013.01); *H01S 3/0014* (2013.01)

(58) Field of Classification Search
CPC ..... G01J 1/4257; B23K 26/03; B23K 26/426; B23K 31/125; B23K 26/063
See application file for complete search history.

(56) References Cited

U.S. PATENT DOCUMENTS

| 4,839,496 | A | * | 6/1989 | Armier | B23K 26/04 |
|---|---|---|---|---|---|
| | | | | | 219/121.63 |
| 5,486,677 | A | * | 1/1996 | Maischner | B23K 26/032 |
| | | | | | 219/121.83 |
| 6,646,728 | B1 | | 11/2003 | Tang et al. | |
| 6,696,667 | B1 | * | 2/2004 | Flanagan | 219/121.72 |
| 7,129,438 | B2 | | 10/2006 | Bates et al. | |
| 2005/0115940 | A1 | | 6/2005 | Matsushita et al. | |
| 2005/0224470 | A1 | * | 10/2005 | Burt | B23K 26/147 |
| | | | | | 219/121.63 |

(Continued)

FOREIGN PATENT DOCUMENTS

| EP | 1371443 B1 | 1/2006 |
|---|---|---|
| EP | 1415755 B1 | 9/2008 |

OTHER PUBLICATIONS 3.7 Integrated Laser Performance Measurements; http://www.ophiropt.com/user_files/laser/beam_profilers/BA500-and-Beam-Cube.pdf. pp. 195-198; Jan. 8, 2013 Spiricon OPHIR Photonics, 4 pages.

(Continued)

*Primary Examiner* — Georgia Y Epps
*Assistant Examiner* — Don Williams

(57) ABSTRACT

A system for continuously monitoring a laser beam includes a photodiode sensor mounted adjacent to a laser beam optical path. A laser beam optical path analysis module connected to the photodiode sensor and adapted to receive, analyze and report the sensor output from the photodiode sensor.

9 Claims, 3 Drawing Sheets

(56) References Cited

U.S. PATENT DOCUMENTS

| | | | |
|---|---|---|---|
| 2007/0045253 A1* | 3/2007 | Jordens | B23K 26/03 219/121.71 |
| 2007/0223544 A1* | 9/2007 | Yamazaki et al. | 372/29.014 |
| 2007/0250049 A1 | 10/2007 | Feige et al. | |
| 2009/0316150 A1* | 12/2009 | Myrick | G01J 3/02 356/326 |
| 2011/0298156 A1 | 12/2011 | Hooper et al. | |
| 2012/0092755 A1 | 4/2012 | Baird et al. | |

OTHER PUBLICATIONS

Wasilewski et al., "Femtosecond Laser Pulses Measured with a Photodiode—FROG Revisited", Institute of Experimental Physics, Warsaw University, 5 pages, Nov. 2003.

Otto et al., "Temporal Dynamics of Mode Instabilities in High-Power Fiber Lasers and Amplifiers", 2012 Optical Society of America, vol. 20, No. 14 Optics Express, 13 pages.

(PCT/2014/058157) PCT Notification of Transmittal of the International Search Report and the Written Opinion of the International Searching Authority, dated Feb. 25, 2015, 9 pages.

\* cited by examiner

SYSTEM FOR CONTINUOUS LASER BEAM MONITORING AND ANALYSIS

BACKGROUND

The disclosure relates to methods of continuously monitoring a laser beam using a photo diode sensor.

Lasers are an energy source which is used for welding materials by using pulsed high peak power combined with relatively small spot sizes. In order to insure reliable welds, features have been developed to provide increased control of the laser output. In some processes, the analysis of the quality of the weld is delegated to off-line visual inspection of each welded component. In other processes, infrared, ultraviolet, high-speed camera sound and transducer acoustic sensors are used as a part of monitoring techniques which typically use complex mathematical algorithms to analyze the sensor output. It is desirable to provide a laser monitoring system which utilizes a sensor for direct laser beam sensing and utilizes simple sensor output data analysis for quality control of welding processes and not laser beam power or energy.

SUMMARY

The disclosure provides systems for continuously monitoring a laser beam using a photo diode sensor. The photo diode sensor is mounted adjacent the optical path of a laser beam. A laser beam optical path analysis module is operatively connected to the photodiode sensor and is and adapted to receive, analyze and report the sensor output from the photodiode sensor.

DETAILED DESCRIPTION

The systems of the disclosure are useful for continuously monitoring a laser beam of a laser system, for example a laser system for welding. By continuously monitoring a laser beam of a laser system used for welding a workpiece, the monitored characteristics or parameters of the laser beam can be, for example, correlated to welding process stability, and weld process control which affects weld quality of a workpiece. For example, some of the parameters of the laser beam that can be monitored continuously include the number of laser beam pulses fired, the average laser beam pulse duration, the maximum laser beam pulse duration, the minimum laser beam pulse duration, the average laser beam pulse amplitude, and combinations of any of these parameters. Such parameter measurements coupled with a data analysis module permits waveform evaluation and performance limits and acceptance criteria for example, for a weld or a welded workpiece. The systems described in this disclosure do not include or excludes the measurement or calculation of laser beam energy or power.

Figure 1:
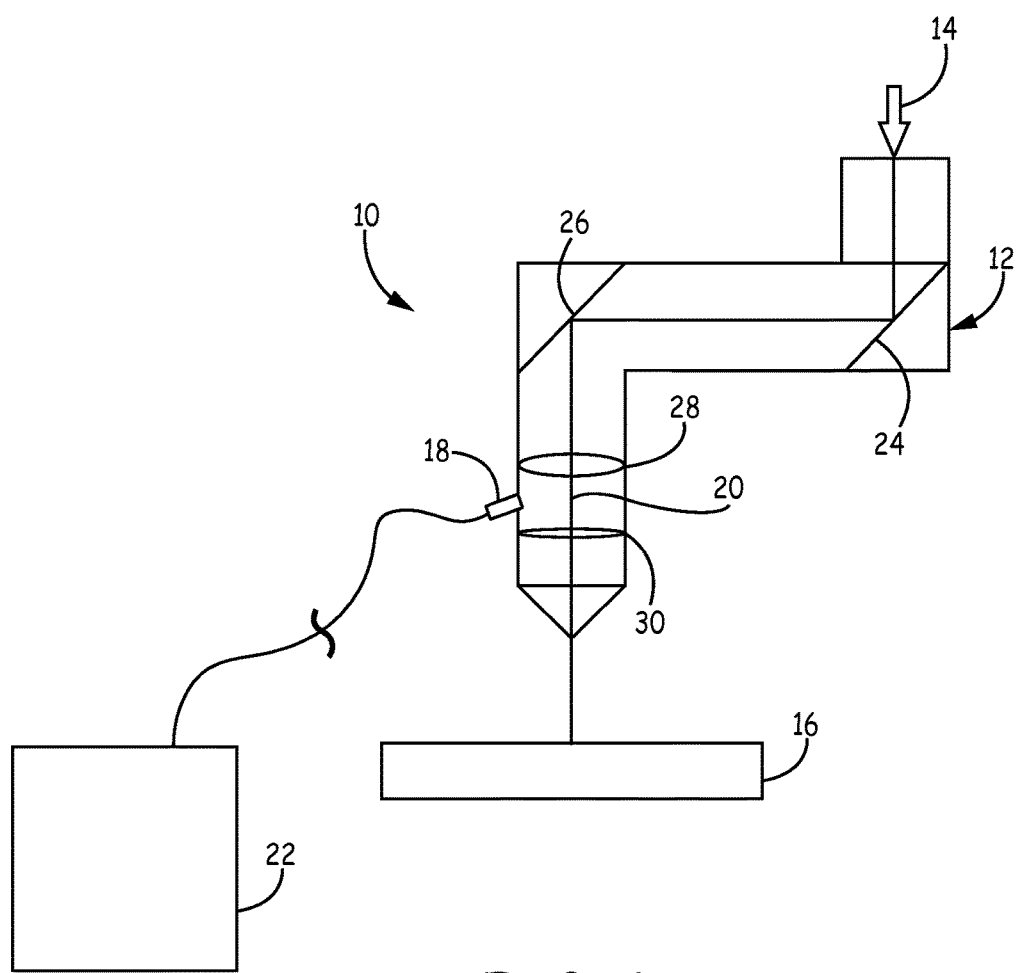
FIG. 1 is a depiction of schematic diagram of an embodiment of a system of the disclosure.

FIG. 1 is a schematic depiction of an embodiment of a system for continuously monitoring a laser beam 10. The system 10 of FIG. 1 comprises a laser beam head 12 which focuses a laser beam 14, for example, onto a workpiece 16, a photodiode sensor 18 mounted adjacent the optical path 20, and a laser beam optical path analysis module 22 connected to the photodiode sensor 18. In this embodiment, the laser beam head 12 contains bending mirrors 24, 26, a final focusing optic 28 and a cover slide 30. The photodiode sensor is mounted into the laser beam head at a point that is downstream from all optics. In this embodiment, the photodiode sensor is mounted after the final focusing optic 28 and before the cover slide 30.

The position of the photodiode sensor relative to the laser beam is dependent upon the sensitivity of the photodiode sensor that is used and the energy produced by the laser. Typically, the photodiode sensor will produce more continuous signal or sensor output the closer in proximity it is to the laser beam and less continuous sensor output the farther in proximity it is from the laser beam. The more sensitive the photodiode is and the more energy produced by the laser, the further the distance the photodiode sensor can be positioned from the laser beam. Since the photodiode sensor is used to generate sensor output that is analyzed on a comparative basis, the distance of the photodiode sensor from the laser beam should be constant or fixed. In one example, the photodiode sensor can be mounted in a suitable lens tube (e.g., Thorlabs) which can be threaded into a female threaded adapter that is within the laser beam head. Filtration can also be used to adjust the sensitivity of the photodiode sensor. Useful photodiode sensors have a wavelength within the range of the operating laser, for example, a range of 800-1700 nm and have a sensor made from silicon or indium gallium arsenide or both. The photodiode sensors should also have a rise/fall time that exceeds the range of the operating laser.

Generally, any industrial or commercial laser that can be used in pulsed or continuous wave modes can be used in the systems described in this disclosure, for example, a Nd:YAG laser.

Figure 2:
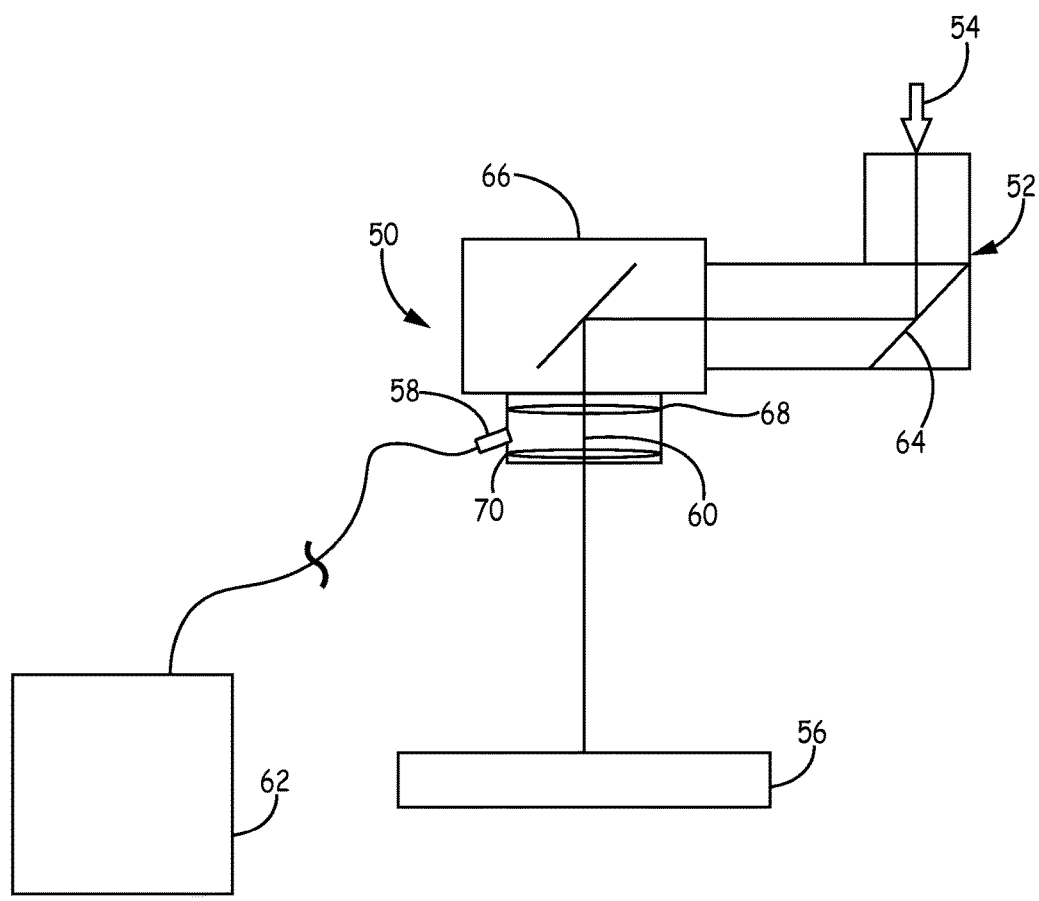
FIG. 2 is a depiction of schematic diagram of another embodiment of a system of the disclosure.

FIG. 2 is a schematic depiction of another embodiment of a system for continuously monitoring a laser beam 50. The system 50 of FIG. 2 comprises a laser beam head 52 which focuses a laser beam 54, for example, onto a workpiece 56, a photodiode sensor 58 mounted in the optical path 60, and a laser beam optical path analysis module 62 connected to the photodiode sensor 58. In this embodiment, the laser beam head 52 contains a bending mirror 64, a mirror galvanometer 66, a final focusing optic 68 and a cover slide 70. The photodiode sensor is mounted in the laser beam head at a point that is downstream from all optics, including the mirror galvanometer. In this embodiment, the photodiode sensor is mounted downstream from or after the final focusing optic 68 and upstream from or before the cover slide 70.

Figure 3:
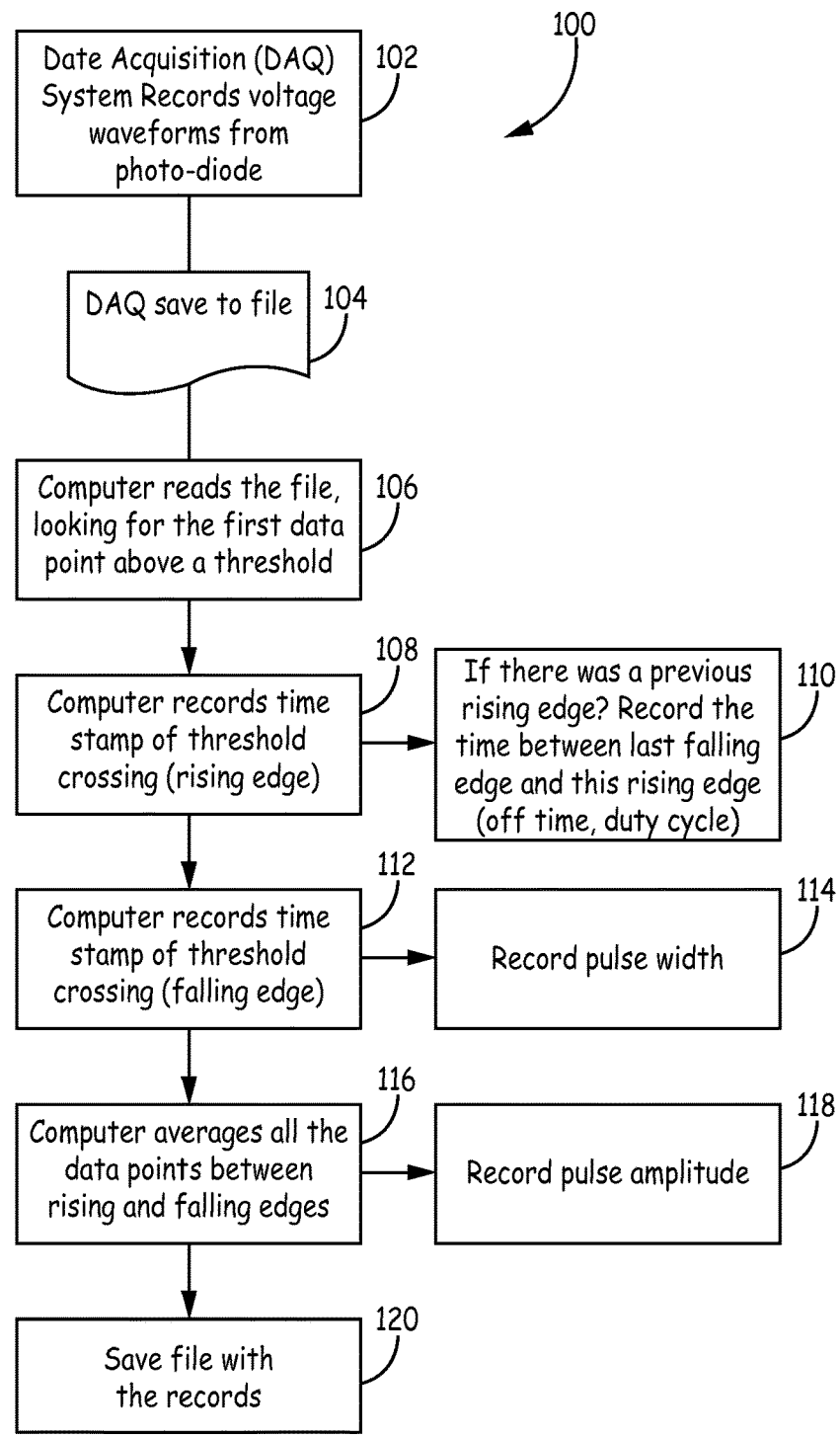
FIG. 3 is a depiction of a flow diagram of a system for collecting and analyzing photodiode sensor data.

FIG. 3 is a flow diagram 100 of an embodiment of the logic used to analyze the data acquired from the photodiode in an embodiment of a laser beam path analysis module. A data acquisition system first receives and records the photodiode sensor output 102, for example voltage waveforms from the photodiode which correspond to laser beam pulses resulting from the welding process, for example, on a component part or a substrate. The sample rate of the photodiode sensor is dependent upon the particular application and the parameters of the laser beam that are being monitored, for example, the number of laser beam pulses fired, the average laser beam pulse duration, the maximum laser beam pulse duration, the minimum laser beam pulse duration, and the average laser beam pulse amplitude. In one embodiment, the sample rate of the photodiode sensor is about 1000 $s^{-1}$.

Once the photodiode sensor output is received and recorded for that particular welding process, the data acquisition system saves the acquired sensor data to a file 104. Computer software is used to review the acquired sensor data beginning with the first acquired data to identify a first data point above a pre-set threshold 106. The threshold is set to remove noise from any subsequent calculations. The computer software records a time stamp for the first acquired data, i.e., the rising edge of the pulse or voltage waveform, above the threshold 108.

For subsequent voltage waveforms having rising edges, the software also records a time stamp for the time between the previous falling edge of the previous voltage waveform that crosses the threshold and the rising edge of the subsequent voltage waveform 110 that crosses the threshold. This time stamp or period corresponds to the off-time or duty cycle of the laser beam pulses. For each voltage waveform, the computer software records a time stamp of the falling edge of the voltage waveform 112. From this time stamp and the time stamp recorded for the rising edge of the voltage waveform 108, a pulse width or voltage waveform width is calculated for each laser beam pulse 114.

For each pulse or voltage waveform, the computer software captures all of the data point between the rising and falling edges above the threshold and calculates a moving average of the collected data points 116. From this data, the moving average having the highest value is selected and recorded as the amplitude of the pulse or voltage waveform 118. The computer software records all of the collected and calculated data corresponding to the particular welding process 120.

Since the data from the photodiode sensor is collected real-time during a welding process and stored, the analysis of the collected data to determine the duty cycle, pulse width and pulse amplitude can be performed in different ways. In one embodiment, each set of collected data for each complete pulse or voltage waveform can be analyzed individually in steps 106 through 118 sequentially. In this embodiment, each subsequent set of data corresponding to a "pulse" would be analyzed in the same way until the collected data was exhausted. In another embodiment, all of the collected data corresponding to all of the pulses is analyzed at each individual step. Once the first data point threshold is determined at 106, then all of the data corresponding to all of the pulses recorded for a welding event would be analyzed to determine time-off between each pulse or duty cycle. Next, all of the data recorded for all of the pulses would be analyzed to determine the pulse width of all of the pulses. Then the same process is used to determine the pulse amplitude for each pulse.

In another embodiment, the system can be used to count the number of pulses required to complete a task, for example, a seam weld or a series of spot welds. In an application where the same area of seam or the same number of spot welds on a workpiece is welded on an assembly line, the number of pulses used could be calculated and compared to a threshold or average or maximum and used as a quality parameter.

In another embodiment using a continuous wave, the amount of time the laser beam is on to weld an entire seam or spot weld an area can be measured and compared to minimum, average and maximum values of the amount of time the laser beam is on and used as a quality parameter.

The amount of time the laser beam is on can also be used to correlate to other parameters. For example, the amount of time the laser beam is on can be correlated to: engraving quality by verifying the depth of engraving; cutting quality by verifying the depth of the cut; and marking quality by verifying that the energy delivered by the laser beam is not high enough to ablate the material or workpiece. The amount of time the laser beam is on can also be used to verify the adequacy or quality of heat treating of a workpiece and the amount of a material that is deposited.

Whichever method of data analysis is used, further data analysis, such as statistical analysis, can be performed. Statistical analysis can be used for example to determine averages, medians, standard deviation, ranges and process control limits. Such statistical analysis results can be used as an indication of whether the welding process has performed within acceptable control limits. Such a comparison can be used as an indication of the presence or absence of a welding process having an acceptable level of quality or performance.

Various examples or embodiments have been described. These and other examples are within the scope of the following claims.

The invention claimed is:

1. A system for continuously monitoring a laser beam in a laser welder comprising:
   an optical path beginning from a laser beam source, continuing through a laser beam head and ending at a workpiece, the laser beam head having a proximal end and a distal end, the distal end being proximal to the workpiece;
   mirrors within the laser beam head, wherein each mirror between the proximal and distal ends of the laser beam head are non-transmitting, bending mirrors;
   a single photodiode sensor mounted within the distal end of the laser beam head and adjacent the optical path at a point along the optical path distal from all of the mirrors, before the optical path ends at the workpiece, and before the laser beam following the optical path reaches the workpiece and positioned for direct access to the laser beam to directly sense the laser beam in the optical path and adapted to provide a continuous sensor output; and
   a laser beam optical path analysis module connected to the photodiode sensor in the laser welder and adapted to receive, analyze and report the sensor output from the photodiode sensor.

2. The system of claim 1 wherein the laser beam optical path analysis module reports the sensor output as number of laser beam pulses fired, average laser beam pulse duration, maximum laser beam pulse duration, minimum laser beam pulse duration, average laser beam pulse amplitude, or any combination thereof.

3. The system of claim 2 wherein the laser beam optical path analysis module excludes reporting the sensor output as laser beam energy or laser beam power.

4. The system of claim 1 further comprising a mirror galvanometer.

5. The system of claim 4 wherein the photodiode sensor is mounted downstream from the mirror galvanometer.

6. The system of claim 1 further comprising a laser.

7. The system of claim 6 wherein the laser emits a laser beam having a wavelength of from 800 to 1700 nm.

8. A system for continuously monitoring a laser beam in a laser welder having an optical path beginning from a laser beam source and ending at a workpiece comprising:
   mirrors within the optical path, wherein each mirror between proximal and distal ends of the optical path are non-transmitting, bending mirrors;
   a single photodiode sensor mounted adjacent the optical path and positioned for direct access to the laser beam in the optical path and mounted at a point along the optical path distal from all of the mirrors and before the laser beam following the optical path reaches a workpiece, the photodiode sensor adapted to provide a continuous sensor output; and a laser beam optical path analysis module connected to the photodiode sensor in the laser welder and adapted to receive, analyze and report the sensor output from the photodiode sensor.

9. The system of claim 8 wherein the laser beam optical path analysis module reports the sensor output as number of laser beam pulses fired, average laser beam pulse duration, maximum laser beam pulse duration, minimum laser beam pulse duration, average laser beam pulse amplitude, or any combination thereof.

* * * * *